United States Patent [19]
Rode

[11] Patent Number: 5,435,576
[45] Date of Patent: Jul. 25, 1995

[54] SPRING GASKET

[76] Inventor: John E. Rode, Persse Rd., Fonda, N.Y. 12068

[21] Appl. No.: 997,353

[22] Filed: Dec. 28, 1992

[51] Int. Cl.$^6$ ............................................. F16J 15/08
[52] U.S. Cl. ................... 277/236; 277/205; 415/170.1
[58] Field of Search ............ 277/205, 236, 168, 170, 277/200, 216; 415/170.1

[56] References Cited

U.S. PATENT DOCUMENTS

| | | | |
|---|---|---|---|
| 3,520,544 | 7/1970 | Taylor | 277/236 |
| 3,672,019 | 6/1972 | Barnbrook et al. | 29/148.4 A |
| 3,774,896 | 11/1973 | Rode | 267/182 |
| 3,794,311 | 2/1974 | Rode | 267/158 |
| 3,797,836 | 3/1974 | Halling | 277/236 |
| 4,125,929 | 11/1978 | Rode | 29/446 |
| 4,452,462 | 6/1984 | Karr, Jr. | 277/236 |
| 4,505,290 | 3/1985 | Scobie | 277/236 |
| 4,759,555 | 7/1988 | Halling | 277/236 |
| 5,058,906 | 10/1991 | Adamek et al. | 277/236 |
| 5,240,263 | 8/1993 | Nicholson | 277/236 |

*Primary Examiner*—Daniel G. DePumpo
*Attorney, Agent, or Firm*—Roger M. Rickert

[57] ABSTRACT

A gas pressure differential sealing ring for forming a seal between a pair of annular surfaces which are rotatable with respect to one another about a common axis to be used, for example, in the compressor portion of a turbojet engine, is disclosed. The sealing ring has a metallic annulus with a central axis and a generally uniform M-shaped cross sectional configuration. One of the surfaces against which it is to seal is substantially flat and generally in a plane perpendicular to the axis while the other is frustoconical. The annulus is formed of a strip of metal of generally uniform thickness to have a uniform serpentine cross-sectional configuration. The annulus is interrupted by a gap creating a pair of closely adjacent ends facing one another, each of the same serpentine shape as the uniform cross-sectional configuration. The serpentine cross-sectional configuration is a generally uniform M-shaped cross sectional configuration including a plurality of arcuate bends and a pair of leg portions extending from a corresponding pair of the arcuate bends toward one another. Each leg is inclined at about 45 degrees to the axis of the annulus with either leg adapted to sealingly engage the frustoconical surface and the arcuate bend associated with the other leg adapted to engage tile flat surface.

9 Claims, 1 Drawing Sheet

SPRING GASKET

SUMMARY OF THE INVENTION

The present invention relates generally to gaskets and more particularly to a metallic spring gasket for sealing a gas pressure differential within a turbojet engine. In particular, the present invention provides a relatively high temperature the order of 1000 degrees Fahrenheit) low air pressure differential (on the order of 5 psi) seal in the compressor portion of such an engine.

Within turbojet engines, there are a number of movable fan blade segments and a number of fixed blade segments. There are relatively movable surfaces associated with these blades between which it is desirable to provide a seal. The region in which this seal is located is frequently referred to as a vane support cavity. Unfortunately, the surfaces are not parallel to one another, but rather one is relatively flat and in a plane perpendicular to the engine axis while the other is symmetric about the engine axis, frustoconical in shape and inclined at about 45 degrees with respect to that axis.

Among the several objects of the present invention may be noted the provision of a sealing ring for a turbojet engine; the provision of such a sealing ring which is ideally suited to providing a seal between a flat and a frustoconical surface; and the provision of a metallic sealing ring having a symmetric cross-section thereby allowing assembly in either of two orientations.

There are further constraints on a gasket to be used in such an environment. The diameter of the cavity to be sealed is about one hundred times the cross-sectional size of the gasket. During initial engine warm-up the gasket may experience thermal expansion more rapidly that the surrounding engine parts resulting in gasket or engine damage. Since some leakage through this seal is allowable, a further object is the provision of a sealing ring with a thermal expansion gap.

The separation between the surfaces to be sealed is subject to variations. Spacer washers of the type disclosed in U.S. Pat. No. 3,672,019 as well as my prior U.S. Pat. Nos. 3,774,896; 3,794,311; and 4,125,929 have enjoyed widespread commercial success reducing the time and effort involved in preloading bearings and other axially spaced parts. One trait which is common among the prior art spacer washers and which aptly suits such spacer washers to their present commercial uses is that once the elastic limit of the spacer washer is exceeded, the stress-strain curve for the spacer washer becomes essentially flat with plastic deformation occurring without significant change in the applied compressive force. This plastic deformation effectively shifts the linear elastic portion of the curve so that when the compressive force is partially removed, the spacer washer re-expands axially in an elastic manner. In my prior patented arrangements, the spacer washers have, in longitudinal cross-section, a relatively thin wall of substantially uniform thickness throughout. Moreover, my prior patented arrangements all have an axial (longitudinal) symmetry. Such characteristics are aptly suited to many applications, but up until now, such spacer washers have not been used in large diameter, small separation sealing applications between nonparallel surfaces such as between a conical surface and a diametral surface. Another object of the present invention is to provide a seal which remains under a constant compressive force throughout a range of values for the separation between the surfaces against which it seals.

The forgoing as well as other objects and advantageous features of the present invention will be in part apparent and in part pointed out hereinafter.

In general, a gas pressure differential sealing ring to be used, for example, in a turbojet engine to provide a seal between relatively movable parts within the air compressor portion of that engine is formed as an annulus with a central axis, a pair of axially opposed sealing surfaces, and a thermal expansion compensating gap interrupting the annulus. The length of the thermal expansion compensating gap is about two orders of magnitude less than the outer diameter of the annulus. Different parts may respond differently to thermal changes and may expand or contract at different rates. Thus, for example, transient thermal expansion created by warm-up during initial engine operation may change the length of the gap.

Also in general and in one form of the invention, a gas pressure differential sealing ring for use in a turbojet engine is formed as a metallic annulus having a central axis and having a generally uniform M-shaped cross sectional configuration. The M-shape includes a plurality of arcuate bends and a pair of leg portions extending from a corresponding pair of the arcuate bends toward one another with each leg inclined at about 45 degrees to the axis of the annulus. One of the legs is adapted to sealingly engage an oblique annular surface in an engine. The arcuate bend which is not associated with the leg which seals with the oblique surface is adapted to sealingly engage a second relatively flat annular surface in the engine. In the preferred form, the sealing ring is symmetric about the "M" so that it may be inserted in either of two orientations with either leg sealingly engaging the oblique annular surface and the other or opposed arcuate bend then seals with the flat surface.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
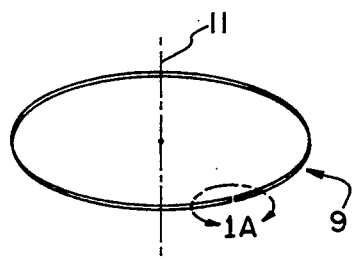
FIG. 1 is a perspective view of a gas pressure differential sealing ring according to my invention in one form.
Figure 2:
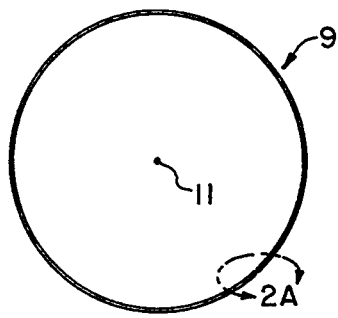
FIG. 2 is a front plan view of the sealing ring of FIG. 1.

In FIGS. 1 and 2 there is shown a sealing ring of circular configuration having a diameter of about 38 inches. This ring has a cross-sectional (axial) length of only 0.275 inches in the direction of lines 4—4 of FIG.

Figure 1A:
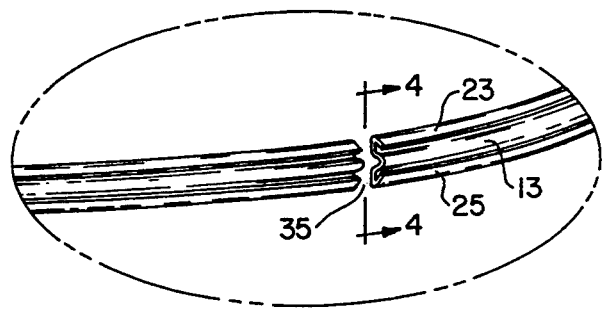
FIG. 1A is an enlarged perspective view of the portion included within the line 1A of FIG. 1.
Figure 2A:
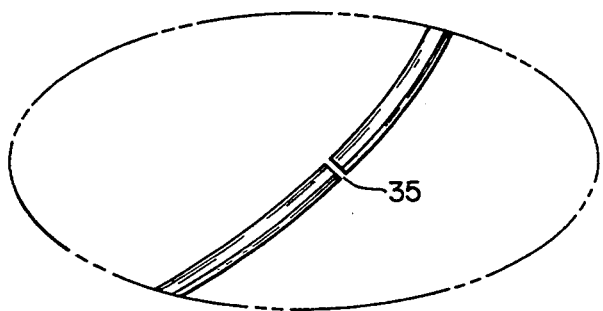
FIG. 2A is an enlarged front view of the portion included within the line 2A of FIG. 2.

1A. Thus, the diameter is two orders of magnitude larger than the length. Moreover, the separation between the faces (width of the gap) in FIGS. 1A and 2A is only about 0.3 inches, two orders of magnitude less that the ring diameter. With such a disparity in dimensions, it is difficult to simultaneously view the entire ring and see its unique configuration. This is the reason for the enlargements shown in FIGS. 1A and 2A of their respective circled portions of FIGS. 1 and 2. The gas pressure differential sealing ring 9 is formed as a metallic annulus having a central axis 11 and having a generally uniform M-shaped cross sectional configuration best seen in FIGS. 1A, 3 and 4. The M includes a plurality of arcuate bends 13, 15, 17, 19 and 21 along with a pair of generally straight leg portions 28 and 25 extending from a corresponding pair of the arcuate bends (17 and 21 respectively) toward one another. The relatively straight sections 27 and 29 between arcuate bends are generally parallel to the axis 11 and each leg 23 or 25 is inclined at and angle $\beta$ of about 45 degrees to these straight sections and thus, also, to the axis 11 of the annulus. In one implementation, the angle $\beta$ was initially formed closer to 40 degrees (still an angle of "about" 45 degrees) than to 45 for reasons which will become apparent.

Figure 3:
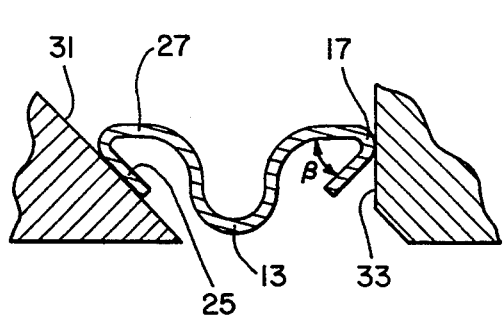
FIG. 3 is a view in cross-section of the sealing ring of FIGS. 1 and 2 sealingly engaging a frustoconical surface on one side and a flat surface on the other side.

One of the legs, 25 in FIG. 3, is adapted to sealingly engage an oblique, typically frustoconical, annular surface in the compressor of a turbojet engine. Leg 25 extends from a first one 21 of corresponding or leg supporting pair of arcuate bends. The other of the corresponding pair of arcuate bends 17 is adapted to sealingly engage a second annular surface 33 in the engine.

The horizontal dimension of the cross-section in FIG. 3 is typically about 0.270 inches while the outer diameter of the circle as seen in FIG. 2 is about 38 inches. Thus, the separation between the oblique annular surface 31 and the second annular surface 33 is at least two orders of magnitude (a factor of 100) less than the outer diameter of the metallic annulus. For this reason, the axis 11 in FIG. 3 is far above, but parallel to the top edge of the paper, thus, the second annular surface 33 lies in a diametral plane generally perpendicular to that central axis 11 and adjacent the other leg 23. The surfaces 25 and 33 are relatively movable portions of a turbojet compressor and rotate relative to one another about the central axis during engine operation.

Figure 4:
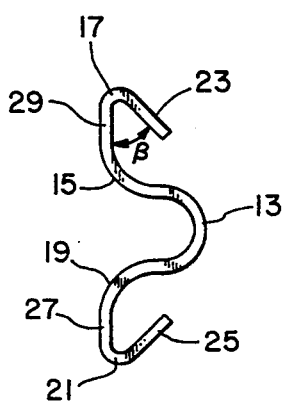
FIG. 4 is an edge view along the lines 4—4 of FIG. 1A.

The annulus is interrupted by a gap 35 of FIGS. 1A and 2A creating a pair of closely adjacent ends, one of which is visible in FIG. 1A, facing one another and each of the same M-shape as the uniform cross-sectional configuration. FIG. 4 is a view of one of the end visible in FIG. 1A while FIG. 3 is a cross-sectional view. The length of the gap measured between the free ends is about 0.3 inches or two orders of magnitude (a factor of one hundred) less than the outer diameter of the annulus. The gap is provided to allow for thermal expansion of the relatively small mass sealing ring as compared to the surrounding relatively massive engine parts. Thermal expansion created by warm-up during initial engine operation reduces the length of the gap. There is, of course, some air leakage through the gap 35, however, the gap is so small as compared to the circumference of the annular ring and the pressure differential is sufficiently low (typically 5 psi) that effective sealing is accomplished and the ring is properly called a "seal."

The method of forming a seal according to the present invention should now be clear. A relatively flat strip of metal is looped and the ends are welded together. This "barrel hoop" is then roll formed to take on the M-shaped cross sectional configuration. The annulus is manufactured according to the techniques of my above mentioned prior patents and thus remains under a constant compressive force throughout a range of values for the separation between the oblique annular surface 31 and the second annular surface 33. Finally, the gap is cut. Being symmetric about the middle of the "M", the sealing ring may be inserted into an engine with either leg sealing against the frustoconical surface.

From the foregoing, it is now apparent that a novel gas pressure differential seal has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. In the vane support cavity of a turbojet engine, a gas pressure differential sealing ring for providing a seal between an oblique annular surface and a second annular surface which annular surfaces rotate relative to one another during engine operation, the sealing ring comprising a metallic annulus having a central axis and having a generally uniform M-shaped cross sectional configuration symmetric with respect to a plane lying perpendicular to the central axis and including a first arcuate bend symmetrically spanning said plane, a pair of arcuate bends disposed symmetrically one to each side of said plane and extending from the first arcuate bend, a further pair of arcuate bends disposed symmetrically one to each side of said plane beyond said pair of arcuate bends, and a pair of leg portions extending from the further pair of the arcuate bends away from the central axis and toward one another, each leg inclined at about 45 degrees to the axis of the annulus, one leg adapted to sealingly engage the oblique annular surface, said one leg extending from a first one of said further pair of arcuate bends, and the other of said further pair of arcuate bends sealingly engaging the second annular surface.

2. The gas pressure differential sealing ring of claim 1 wherein the second annular surface lies in a diametral plane generally perpendicular to the central axis and adjacent the other leg.

3. The gas pressure differential sealing ring of claim 1 wherein the separation between the oblique annular surface and the second annular surface is at least two orders of magnitude less than the outer diameter of the metallic annulus.

4. The gas pressure differential sealing ring of claim 3 wherein the annulus remains under a constant compressive force throughout a range of values for the separation between the oblique annular surface and the second annular surface.

5. The gas pressure differential sealing ring of claim 1 wherein the oblique annular surface is of a generally conical shape.

6. The gas pressure differential sealing ring of claim 1 wherein the annulus is interrupted by a gap creating a pair of closely adjacent ends facing one another and each of the same M-shape as the uniform cross-sectional configuration.

7. The gas pressure differential sealing ring of claim 6 wherein the length of the gap measured between the free ends is about two orders of magnitude less than the outer diameter of the annulus.

8. The gas pressure differential sealing ring of claim 7 wherein thermal expansion created by warm-up during initial engine operation reduces the length of the gap.

9. In combination with a pair of annular surfaces which are rotatable with respect to one another about a common axis, one of the surfaces being frustoconical and the other surface being substantially flat and located generally in a plane perpendicular to the common axis, a deformable metallic annulus for forming a dynamic seal between the pair of surfaces during relative rotation of the surfaces, the annulus being formed of a strip of metal of generally uniform thickness to have a uniform serpentine M-shaped cross-sectional configuration including at least a pair of arcuate bends and a corresponding one of the pair of arcuate bends toward one another, each leg inclined at about 45 degrees to the axis of the annulus with either leg adapted to sealingly engage the frustoconical surface and the arcuate bend associated with the other leg adapted to engage the flat surface, the annulus being interrupted by a gap creating a pair of closely adjacent ends facing one another, each of the same serpentine shape as the uniform cross-sectional configuration.

* * * * *